Oct. 16, 1951            C. A. HAWKES            2,571,445
REMOVABLE REFRIGERATING UNIT IN TRUCK BODY
Filed May 7, 1949            4 Sheets-Sheet 1
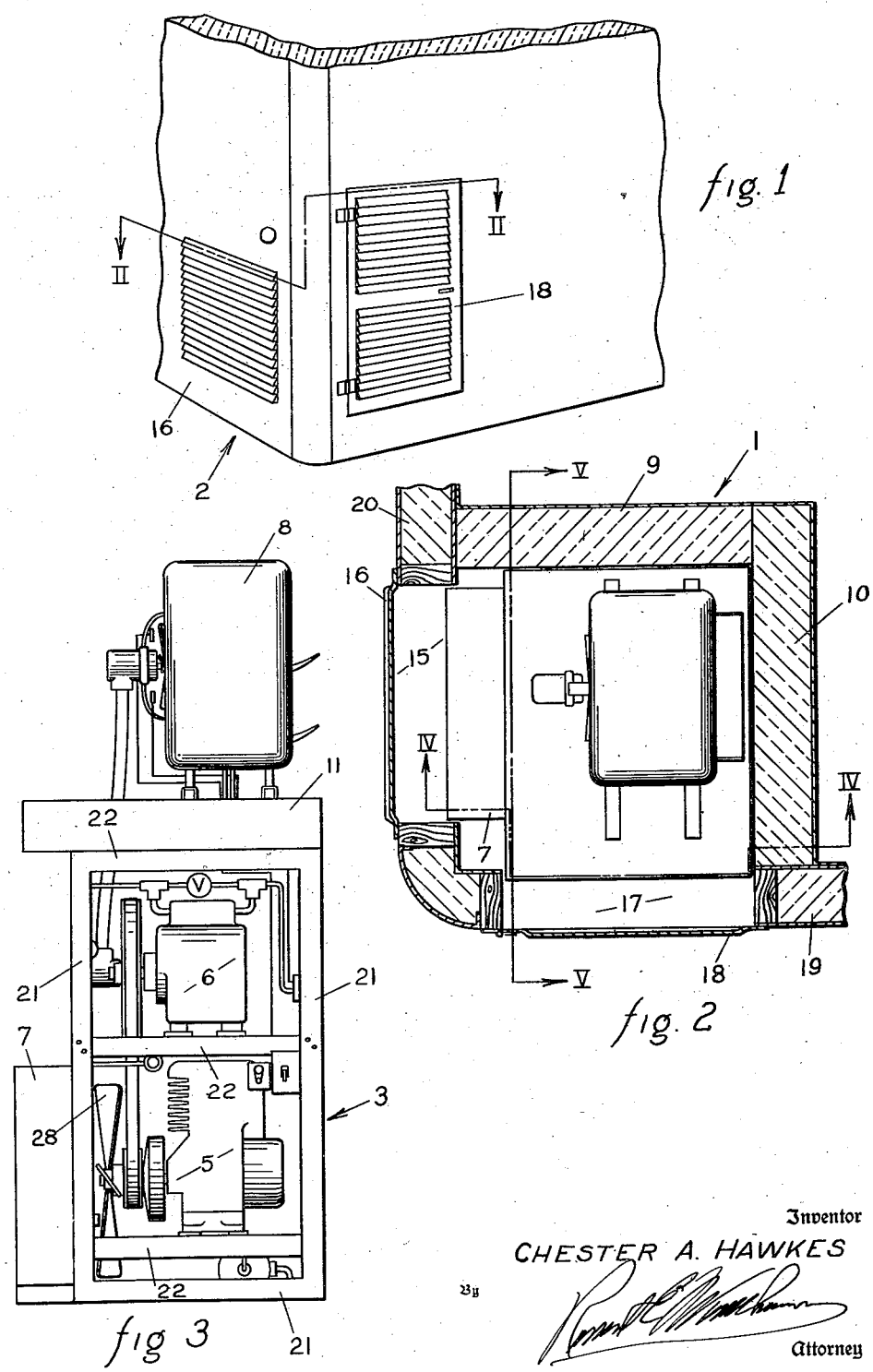
Inventor
CHESTER A. HAWKES
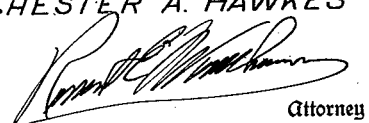
Attorney Oct. 16, 1951             C. A. HAWKES             2,571,445
REMOVABLE REFRIGERATING UNIT IN TRUCK BODY
Filed May 7, 1949                            4 Sheets-Sheet 4
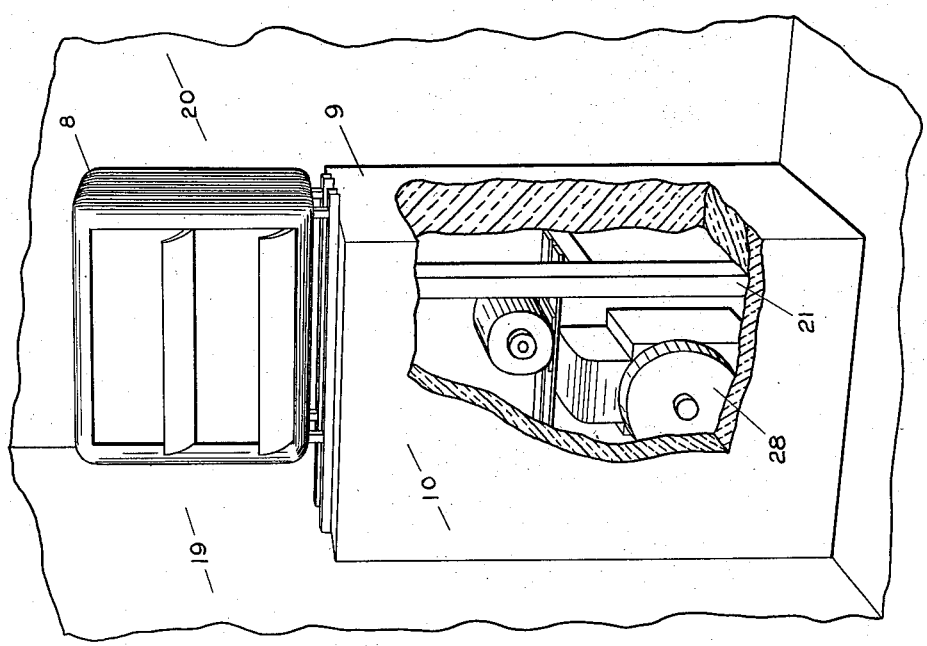
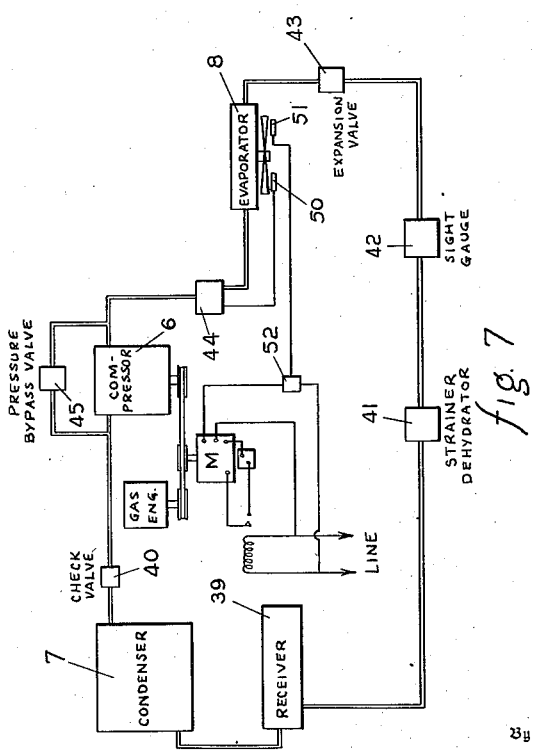
Inventor
CHESTER A. HAWKES
By 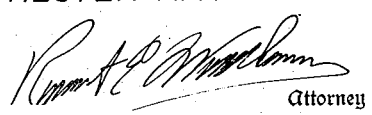
Attorney Patented Oct. 16, 1951

2,571,445

UNITED STATES PATENT OFFICE 2,571,445

REMOVABLE REFRIGERATING UNIT IN TRUCK BODY

Chester A. Hawkes, Lansing, Mich., assignor to Freezerver Products, Inc., Lansing, Mich., a corporation of Michigan Application May 7, 1949, Serial No. 92,056

1 Claim. (Cl. 62—117)

This invention relates in general to a mechanical refrigeration unit in combination with a truck body, and more particularly to certain details of construction of each thereof whereby such a unit may be conveniently installed in a small or medium size truck body and such a truck body, even when not made originally to receive said unit, may be easily modified therefor.

Refrigeration units of various motor driven types have long since been adapted for use in large truck bodies, especially where appearance was of no importance. For small trucks, such as a delivery truck, it has been customary to provide cold panels of heat absorptive material, by which articles in the truck could be kept reasonably cool. Thus far, the relatively large engine driven units available for large trucks have not been feasible for use with small trucks and the cold panels above mentioned are only cold storage units and gradually permits the materials in the truck to become warm as the doors of the truck are repeatedly opened and closed during the coarse of normal use of a delivery truck. Further, a load of perishable articles, as flowers, carried in a delivery truck relying upon cold panels must at the end of the day be transferred to other, more permanent, refrigeration means to keep them over night. This sometimes damages them directly and always requires time and attention.

Accordingly, a primary object of this invention is the provision of a refrigeration unit which may be conveniently installed within the insulated body of a small or medium size truck and also to provide structural features for the truck by which it may be readily modified in either original construction, or subsequent thereto, to receive said unit.

A further object of the invention is to provide cooperating refrigeration unit and truck body structures as aforesaid which are relatively simple and economical to fabricate.

A further object of the invention is to provide cooperating structures as aforesaid which will be sturdy and which will have a long and trouble-free life in spite of the rigorous use to which delivery trucks are normally subjected.

A further object of the invention is to provide structures as aforesaid which will be applicable to truck bodies of a variety of makes and wherein various modifications of refrigeration unit construction may be made without material change in the installation details.

Other objects and purposes of the invention will be apparent to those acquainted with this general type of equipment upon reading of the following specification and inspection of the accompanying drawings.

In meeting the objects and purposes above set forth as well as others incident thereto, I have provided a refrigeration unit comprised of a frame upon which is supported a gas engine, a compressor, an electric motor, a condenser, an evaporator, and selected control mechanisms therefor.

The refrigeration unit is preferably positioned on the truck body floor normally adjacent a wall, and in one preferred embodiment it is placed in the forward corner of the truck body compartment which is immediately behind the truck driver's seat.

The condenser of the refrigeration unit is placed at the side of the frame thereof and means are provided by which air from outside the truck compartment is conducted to and through the condenser and thence returned to the outside. In the specific embodiment therein chosen for illustrative purposes, the condenser of the refrigeration unit is placed near the bottom of said frame on the side thereof adjacent the forward wall of the truck body, and an opening is cut through said forward wall of the truck body in register with the condenser and provided with a closure having suitable fixed louvers or adjustable shutters. An access door is provided in the side of the truck body adjacent to said corner and is in register with an otherwise open side of said frame by which the operating parts of the refrigerator unit may be conveniently serviced from the outside of the truck body. Suitable insulation of substantial thickness is provided for covering all of the parts of the said frame which do not contact a wall or floor of the truck body and said insulation completely covers all of said refrigerating unit excepting only the evaporator. The evaporator extends through and beyond the unit into the air-space within the truck body.

It will be evident, of course, that other arrangements will be possible, and in some cases preferable, but such will become easily and readily accomplished in the light of the disclosure herein made.

For illustration of said preferred embodiment of the refrigeration unit and cooperating truck body construction to which this invention relates, attention is directed to the accompanying drawings in which:

Figure 1 is a fragmentary view of a corner of the truck body into which the unit is installed taken from the exterior of said truck body.

Figure 2 is a section taken on the line II—II of Figure 1.

Figure 3 is a side elevation of the refrigerator unit disassociated from the truck body and with the covering insulation, excepting that at the top of the unit, removed.

Figure 6 is a fragmentary, partially schematic, view of the refrigeration unit installed into a truck body, viewed from the interior of the truck body and with a portion of the insulation surrounding the refrigeration unit removed to expose some of the schematically illustrated inner units thereof.

Figure 7 is a diagrammatic view of one convenient manner of connecting the operative parts of the refrigerator unit and also illustrating certain of the electrical control parts.

Figure 4:
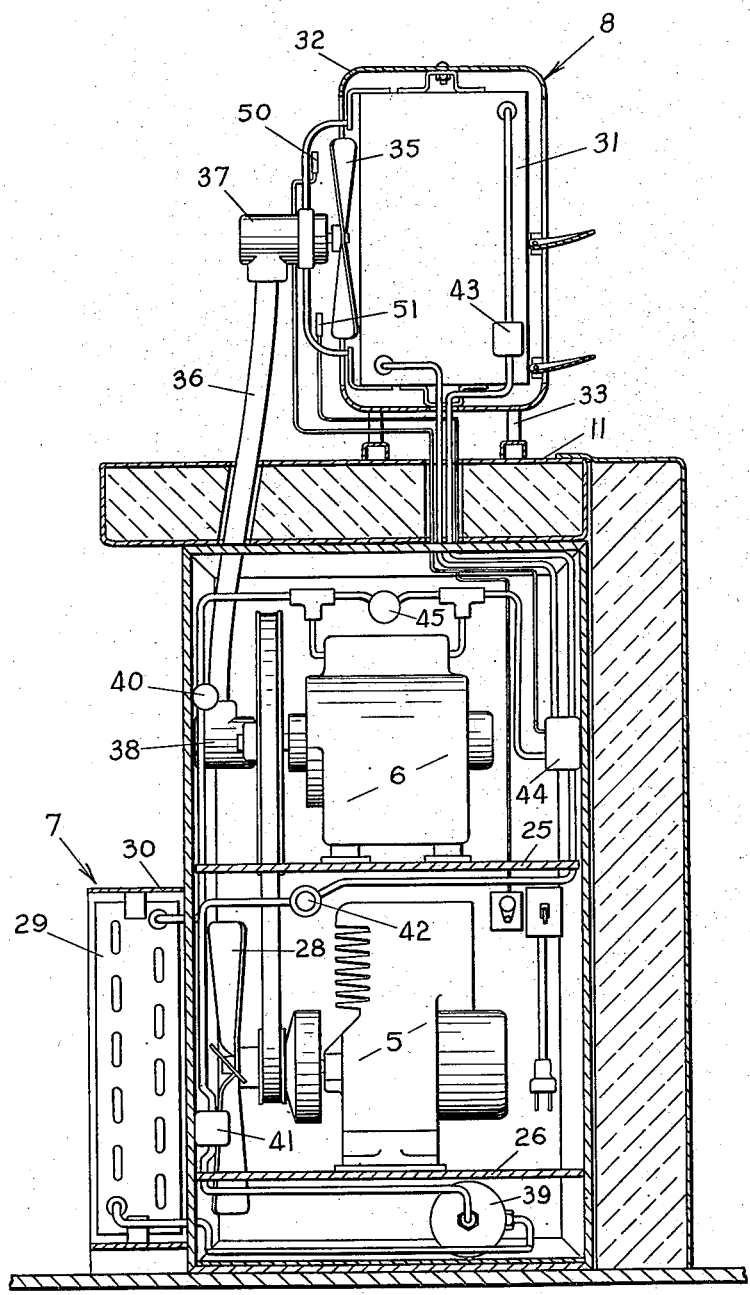
Figure 4 is a sectional, partially schematic, view taken on IV—IV of Figure 2.
Figure 5:
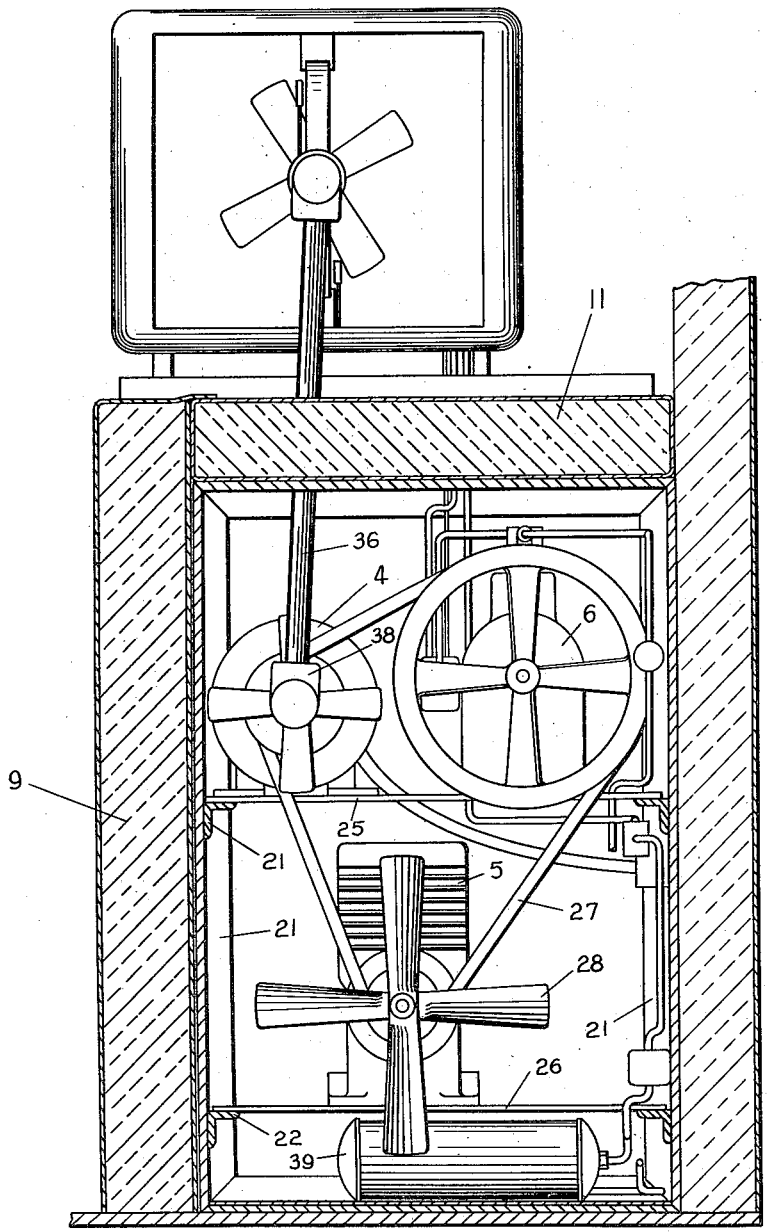
Figure 5 is a sectional view of the refrigeration unit taken on the line V—V of Figure 2.

In carrying out the purposes above set forth, in said preferred embodiment selected for illustrative purposes, I provide a refrigeration unit 1 which is received into a corner 2. The refrigeration unit is provided with a frame 3 supporting an electric motor 4, a gas engine 5 and a compressor 6, together with interconnecting and controlling equipment of any of several conventional forms. Such parts are arranged compactly to be contained fully within the said frame 3. A condenser unit 7 of any conventional form is supported by said frame and, in the illustrated embodiment, it is positioned on the side thereof forwardly with respect to the motion of said truck. However, this positioning may in some instances be modified to utilize other corners of the truck compartment, or even, under some circumstances, a side wall thereof. An evaporator unit 8 is placed above said frame. Insulation panels 9 and 10 cover the sides of this frame which are not contacted by those sides of said truck body forming the corner into which the refrigeration unit is received, and a further insulation panel 11 covers the top of said frame. An opening 15 is provided in a wall 20 of the truck body in register with the condenser 7 and is protected by a louvered plate 16, said wall 20 being in this embodiment a forward wall of the truck body and hereinafter referred to as a forward wall for identification purposes. An opening 17 is provided through a wall 19 of the truck body in register with an otherwise open side of said frame 3 and said opening is closed by the hinged and louvered door 18, said wall 19 being in this embodiment a side wall of the truck body and hereinafter referred to as a side wall for identification purposes. The side wall 19, the forward wall 20 and the floor, roof and other walls of said truck body are all of conventional insulated form providing only that the openings 15 and 17, together with the louvered closures thereof, can be provided therein as indicated.

Turning now to the refrigeration unit and considering same in a little more detail, understanding, however, that such is for illustrative purposes only and excepting as may be hereinafter specifically defined by the claims, no limitation is intended, some description of a preferred embodiment will be made.

The frame 3 may be conveniently comprised of vertical corner members 21 and transverse members 22 which are all conveniently made from angle iron and may be welded, riveted or bolted together as desired. Suitable platforms 25 and 26 are supported horizontally within said frame.

While several specific arrangements are conceivable, I have found it convenient to support a gas engine 5, of any convenient low horsepower type, on the platform 26, and an electric motor 4 and a compressor 6, both of any conventional type, on the platform 25. A V-belt 27 operatively connects the engine, motor and the compressor through appropriate drive pulleys on each thereof, with the drive pulley associated with the engine connected thereto through a suitable unidirectional clutch, whereby the engine will be enabled to drive the motor and the compressor but it will not be driven by the motor. A fan 28 is associated with the engine pulley on the other side thereof from the clutch so that said fan 28 is rotated whenever either the engine or the motor are driving the compressor.

The condenser unit 7 is attached in any convenient manner to the frame 3. The coil assembly 29 thereof is mounted within a casing 30 and is located in register with fan 28 by which air from the outside of the truck body may be drawn through the condenser coils directly onto the engine and then discharge through the opening 17 in the side 19 of the truck body.

The evaporator unit 8 is of any conventional form and will normally have a coil unit 31 supported within a casing 32 and the whole supported by suitable supports 33 on the top of the upper insulation panel 11. A fan 35 is supported at one side of the evaporator in a conventional manner and may be driven in any convenient manner. In a preferred embodiment this is driven by a flexible shaft-and-conduit assembly 36 which is operatively connected through the gear box 37 at its upper end to the fan 35 and through a gear box 38 at its lower end to the shaft of the motor 4. Suitable sealing means, may be provided between the shaft and the conduit at each end of the conduit to prevent the leakage of warm air therethrough into the refrigerated space, or the lubricant in the gear boxes 37 and 38 may be employed to effect this purpose.

The lower horizontal plate 26 is in its embodiment spaced sufficiently from the bottom of the frame to provide space for the reception of the receiver 39 for refrigerant liquid. However, it will be understood that such receiver may be placed anywhere that is convenient.

The piping and electrical connections between the parts described may be of any conventional type which are convenient and effective for the purposes here to be accomplished and the operational conditions to be met. One effective connection and control assembly is shown diagrammatically in Figure 7, and is illustrated semi-diagrammatically in Figure 4. The compressor 6, check valve 40, condenser 7, receiver 39, strainer 41, sight gauge 42, expansion valve 43, evaporator 8, and a thermostatic controlled valve 44, are all connected in series in the usual manner. The by-pass pressure valve 45 is connected between the input and outlet of the compressor to open and permit recirculating of the refrigerant when due to lack of cold load it is shut off from circulating through the entire system.

Dual air space thermostats 50 and 51 are connected to the thermostatically controlled valve 44 and to a motor control switch 52, respectively. The motor control switch, together with any convenient source of electrical potential external of the truck, is operatively connected to the motor.

Thus, during operation of the refrigeration unit by the engine 5, the thermostat 50 by its control of the valve 44 will assure the passage of the proper amount of refrigerant through the evaporator, and when said valve 44 is closed due to lack of load the refrigerant pumped by the compressor will merely circulate through the by-pass valve 45. When the truck is not operating and the refrigeration unit is being operated by the motor by virtue of the connection with a source of electrical potential external of the truck, then through the agency of the thermostat 51 the passage of the refrigerant through the evaporator is controlled by the appropriate starting and stopping of the motor and through it the starting and stopping of the compressor.

It will be evident that any of many other connecting and control systems may be used without departing from the scope of this invention and the foregoing is given as illustrative merely and with no intent to limit the invention.

It will be recognized that numerous variations may be made in the details of the invention but that excepting as the hereinafter appended claims specifically require otherwise, such variations will all be included within the general scope of the invention.

I claim:

In a closed refrigerated truck body, the combination comprising: a pair of adjacent walls and a floor of low thermal conductivity forming a corner; a portable, elongated, rectangular frame structure for carrying a complete refrigeration unit, the said frame structure having its longest sides vertically disposed, two of said sides being nested against said adjacent walls of said truck body, whereby said two sides of said frame are closed by said adjacent walls of said track; an electric motor, an internal combustion engine, a compressor, a refrigerant receiving tank and associated connecting and control means all located within and supported upon said frame, and a fan supported and connected for rotation when either said motor or said engine are driving said compressor; means defining an opening through one of said adjacent walls of said truck axially aligned and in register with said fan and a condenser unit within said opening supported upon one side of said frame and also in register with and axially aligned with said fan; means defining a second opening in the other of said adjacent walls of said truck in register with the side of said frame adjacent thereto, and hinged and louvered means by which said opening may be opened and closed; panels of low thermal conductivity covering the sides of said frame remote from said adjacent walls of said truck body and a further similar panel covering the top of said frame; an evaporator and fan unit above said top panel and operatively connected with the parts within said frame for cooling the air space within said truck; whereby said device may be placed adjacent an opening in said wall of said truck with its insulated sides and end contacting at their edges only said adjacent walls of said truck, said condenser thereby being exposed to the atmosphere and said evaporator being within the uppermost air spaced to be refrigerated and all working parts within said frame being accessible from outside of said truck.

CHESTER A. HAWKES.

REFERENCES CITED

The following references are of record in the file of this patent:

UNITED STATES PATENTS

| Number | Name | Date |
|---|---|---|
| 2,162,512 | McPherson | June 13, 1939 |
| 2,302,189 | Chambers | Nov. 17, 1942 |
| 2,303,857 | Numero | Dec. 1, 1942 |
| 2,459,946 | Kirkpatrick | Jan. 25, 1949 |
| 2,479,170 | Kuempel | Aug. 16, 1949 |
| 2,480,510 | Roper | Aug. 30, 1949 |